L. S. BANDER.
ROLL FILM HOLDER.
APPLICATION FILED JAN. 7, 1909.
920,901.
Patented May 11, 1909.
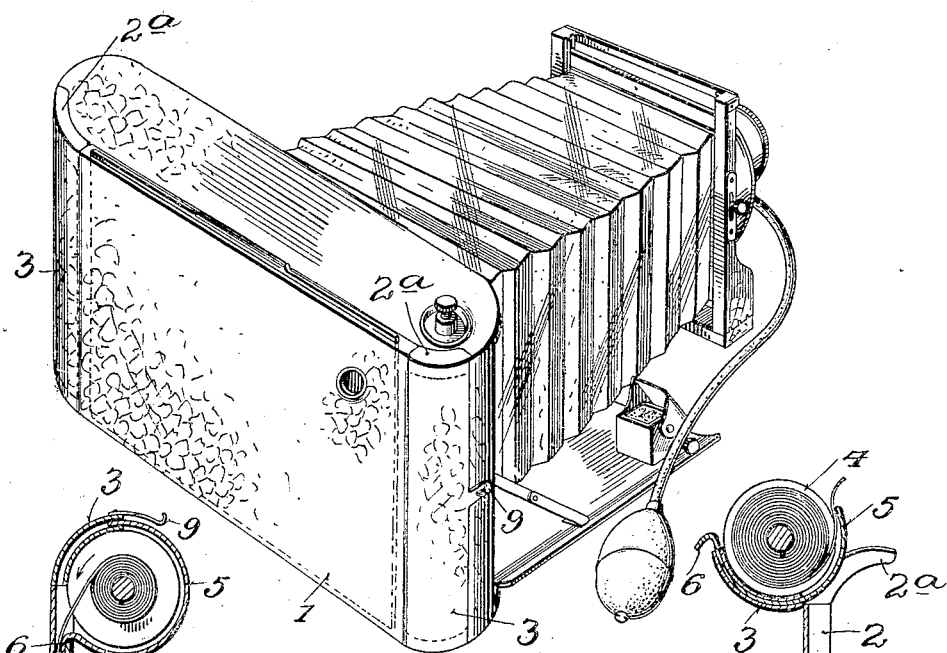
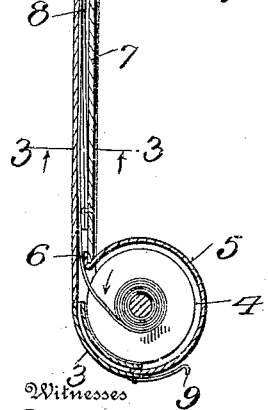
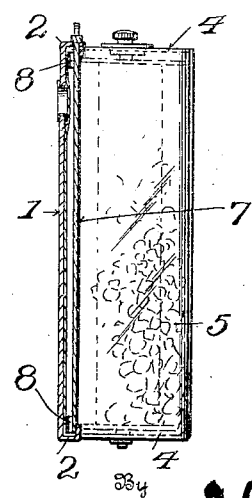
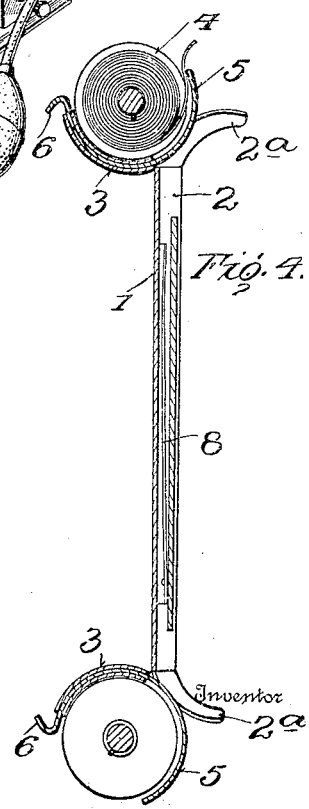

UNITED STATES PATENT OFFICE.

LOUIS S. BANDER, OF SOUTH TACOMA, WASHINGTON.

ROLL-FILM HOLDER.

No. 920,901.  Specification of Letters Patent.  Patented May 11, 1909.

Application filed January 7, 1909. Serial No. 471,193.

*To all whom it may concern:*

Be it known that I, LOUIS S. BANDER, citizen of the United States, residing at South Tacoma, in the county of Pierce and State of Washington, have invented certain new and useful Improvements in Roll-Film Holders, of which the following is a specification.

The present invention relates in general to photography, and more particularly to a novel film holder which is peculiarly constructed so that it can be readily applied to a camera or removed therefrom, thereby enabling the camera to be focused before each exposure, should this be found desirable.

The invention further contemplates a film holder which can be readily applied to the cameras now in common use, which is simple and inexpensive in its construction, and which is so designed as to admit of the films being quickly inserted in position therein or removed therefrom.

For a full understanding of the invention and the merits thereof and also to acquire a knowledge of the details of construction and the means for effecting the result, reference is to be had to the following description and accompanying drawings, in which:

Figure 1 is a perspective view of a camera provided with a film holder constructed in accordance with the invention; Fig. 2 is a longitudinal sectional view through the film holder when detached from the camera; Fig. 3 is a transverse sectional view on the line 3—3 of Fig. 2; and Fig. 4 is a view similar to Fig. 2 with the ends of the film holder swung rearwardly.

Corresponding and like parts are referred to in the following description and indicated in all the views of the drawings by the same reference characters.

The main frame of the film holder embodying the present invention comprises a back 1 and side flanges 2 which extend along opposite edges of the back and project beyond the ends thereof as indicated at 2ª, the said projecting ends of the flanges being curved forwardly for engagement with the body portion of a camera in the usual manner. Carried by each end of the back 1 is a swinging end 3, the said ends preferably having a substantially semi-cylindrical formation and being designed to receive the usual film spools. In the preferred construction these swinging ends are hinged to the main frame by means of a covering of leather or similar material which is applied to the back and ends, the said covering serving to insure a light proof joint between the members. Each of the swinging ends 3 is provided at both the top and bottom thereof with a disk or plate 4 and these disks are perforated to receive the usual spindles upon which the film spools are mounted. It will also be observed that the inclosing sides of each of the swinging ends, is formed of two spaced walls and that a curved slide 5 is received between these spaced walls. These curved slides are designed to be drawn outwardly so as to fit over the film spools when the device is in use and to protect the film upon the spools from light. The outer ends of these curved slides are provided with lips 6 adapted to engage a main slide 7 inserted through a slot in one of the side flanges 2. The film is designed to be wound from a spool in one of the swinging ends 3 upon a spool in the opposite swinging end and to pass over the back 1 between the said back and the black slide 7, spring strips 8 being utilized for forcing the film against the back and preventing it from springing out into the path of the slide. Opposite ends of the film holder are provided with spring catches 9 by means of which it can be applied to a camera and held in position thereon the same as the ordinary film holders now in common use. When the black slide 7 is withdrawn, the films may be exposed in the usual manner. However, should it be desired to focus the camera before making an exposure, it is simply necessary to first insert the black slide 7 and then to remove the film holder from the camera, the said black slide overlapping the lips 6 of the curved slides 5 and coöperating with the frame and swinging ends to form a light proof chamber for the film and to protect it from the light. Owing to the fact that the ends 3 are mounted so as to swing rearwardly the film spools can be readily inserted in position therein or removed therefrom as desired and the camera can be quickly and conveniently loaded or unloaded in the usual manner.

Should it be desired to employ a plate instead of a film, it will be obvious that when one of the ends 3 is swung rearwardly a plate holder could be readily inserted between the back 1 and the slide 7.

Having thus described the invention, what is claimed as new is:

1. In a device of the character described, the combination of a frame, swinging ends applied to the frame, and a slide mounted upon the frame and coöperating with the swinging ends to provide a light proof chamber for a sensitized film.

2. In a film holder, the combination of a frame, swinging ends applied to the frame, slides upon the swinging ends, and a main slide mounted upon the frame and engaging the slides of the swinging ends, the said main slide coöperating with the frame and swinging ends to form a light proof chamber for the reception of the film.

3. In a film holder, the combination of a frame, ends for the frame, curved slides mounted upon the ends, and a main slide mounted upon the frame and adapted to engage the curved slides of the ends, the said main slide coöperating with the frame and ends to form a light proof chamber for the reception of the film.

4. In a film holder, the combination of a frame, swinging ends of a substantially semi-cylindrical formation applied to the frame and adapted to receive the usual film spools, curved slides applied to the swinging ends and formed at their outer ends with lips, and a main slide mounted upon the frame and adapted to engage the lips of the curved slides, the said main slide coöperating with the frame and ends to form a light proof chamber for the reception of the film.

5. In a film holder, the combination of a frame, comprising a back and side flanges, the said side flanges projecting beyond opposite ends of the back and serving to engage a camera, swinging ends applied to the back and designed to receive the usual film spools, curved slides mounted upon the swinging ends, and a main slide mounted upon the side flanges of the frame and adapted to engage the before mentioned curved slides, the said main slide coöperating with the frame and ends to provide a light proof chamber for the reception of the film.

In testimony whereof I affix my signature in presence of two witnesses.

LOUIS S. BANDER. [L. S.]

Witnesses:
E. F. McKenzie,
H. A. Fisher.